United States Patent
Greyzck et al.

(10) Patent No.: US 9,015,656 B2
(45) Date of Patent: Apr. 21, 2015

(54) MAPPING VECTOR REPRESENTATIONS ONTO A PREDICATED SCALAR MULTI-THREADED SYSTEM

(71) Applicant: Cray Inc., Seattle, WA (US)

(72) Inventors: Terry D. Greyzck, Eagan, MN (US); William R. Fulton, Eden Prairie, MN (US); David W. Oehmke, Northfield, MN (US); Gary W. Elsesser, Eagan, MN (US)

(73) Assignee: Cray Inc., Seattle, WA (US)

( * ) Notice: Subject to any disclaimer, the term of this patent is extended or adjusted under 35 U.S.C. 154(b) by 157 days.

(21) Appl. No.: 13/781,285

(22) Filed: Feb. 28, 2013

(65) Prior Publication Data

US 2014/0244968 A1 Aug. 28, 2014

(51) Int. Cl.
*G06F 9/44* (2006.01)
*G06F 9/45* (2006.01)
*G06F 15/76* (2006.01)

(52) U.S. Cl.
CPC . *G06F 15/76* (2013.01); *G06F 8/20* (2013.01); *G06F 8/36* (2013.01); *G06F 8/41* (2013.01); *G06F 8/30* (2013.01)

(58) Field of Classification Search
CPC ............... G06F 8/20; G06F 8/30; G06F 8/36; G06F 8/41; G06F 8/443; G06F 8/447; G06F 8/4452; G06F 9/45516
See application file for complete search history.

(56) References Cited

U.S. PATENT DOCUMENTS

| 7,823,141 | B1 * | 10/2010 | Gustafson et al. | 717/150 |
|---|---|---|---|---|
| 8,296,743 | B2 * | 10/2012 | Linderman et al. | 717/140 |
| 8,327,321 | B2 * | 12/2012 | Biggerstaff | 717/106 |
| 8,418,179 | B2 * | 4/2013 | Papakipos et al. | 717/140 |
| 8,516,454 | B2 * | 8/2013 | Mizrachi et al. | 717/140 |
| 8,527,973 | B2 * | 9/2013 | Little et al. | 717/150 |
| 8,549,499 | B1 * | 10/2013 | Ding et al. | 717/150 |
| 8,739,141 | B2 * | 5/2014 | Song et al. | 717/150 |
| 8,930,961 | B2 * | 1/2015 | Birrell et al. | 717/140 |
| 2004/0194077 | A1 * | 9/2004 | Bharadwaj et al. | 717/140 |
| 2009/0158248 | A1 * | 6/2009 | Linderman et al. | 717/106 |
| 2009/0259828 | A1 * | 10/2009 | Grover et al. | 717/140 |
| 2010/0199257 | A1 * | 8/2010 | Biggerstaff | 717/106 |
| 2011/0010715 | A1 * | 1/2011 | Papakipos et al. | 717/140 |

(Continued)

OTHER PUBLICATIONS

Wong et al., "Demystifying GPU Microarchitecture through Microbenchmarking", 2010 IEEE, ISPASS'10, Mar. 2010, pp. 235-246; <http://ieeexplore.ieee.org/stamp/stamp.jsp?tp=&arnumber=5452013>.*

(Continued)

*Primary Examiner* — Thuy Dao
*Assistant Examiner* — Ben C Wang
(74) *Attorney, Agent, or Firm* — Perkins Coie LLP

(57) ABSTRACT

A system implementing a method for generating code for execution based on a SIMT model with parallel units of threads is provided. The system identifies a loop within a program that includes vector processing. The system generates instructions for a thread that include an instruction to set a predicate based on whether the thread of a parallel unit corresponds to a vector element. The system also generates instructions to perform the vector processing via scalar operations predicated on the predicate. As a result, the system generates instructions to perform the vector processing but to avoid branch divergence within the parallel unit of threads that would be needed to check whether a thread corresponds to a vector element.

22 Claims, 3 Drawing Sheets

(56) References Cited

U.S. PATENT DOCUMENTS

| | | | |
|---|---|---|---|
| 2011/0072412 A1* | 3/2011 | Hasslen et al. | 717/106 |
| 2011/0078415 A1* | 3/2011 | Johnson et al. | 712/208 |
| 2012/0092352 A1* | 4/2012 | Mallick et al. | 345/520 |
| 2012/0192167 A1* | 7/2012 | Eichenberger et al. | 717/150 |
| 2013/0191817 A1* | 7/2013 | Vorbach | 717/150 |
| 2014/0115302 A1* | 4/2014 | Higham et al. | 712/220 |
| 2014/0201450 A1* | 7/2014 | Haugen | 711/125 |

OTHER PUBLICATIONS

Jablin et al., "Warp-Aware Trace Scheduling for GPUs", 2014 ACM, PACT'14, Aug. 2014, pp. 163-174; <http://dl.acm.org/results.cfm?h=1&cfid=477181031&cftoken=37040274>.*

Sylvain Collange, "Identifying scalar behavior in CUDA kernels", Jan. 2011, HAL, pp. 1-18; <https://hal.archives-ouvertes.fr/hal-00555134>.*

Lindholm, Erik et al., "NVIDIA Tesla: A unified Graphics and Computing Architecture," IEEE, Mar.-Apr. 2008, pp. 39-55.

Mahlke, Scott et al, "A Comparison of Full and Partial Predicated Execution Support for ILP Processors," ISCA '95, ACM, New York, NY, 1995, 12 pages.

Mahlke, Scott et al., "Effective Compiler Support for Predicated Execution Using the Hyperblock," IEEE, 1992, pp. 45-54.

* cited by examiner

MAPPING VECTOR REPRESENTATIONS ONTO A PREDICATED SCALAR MULTI-THREADED SYSTEM

STATEMENT REGARDING FEDERALLY SPONSORED RESEARCH

This invention was made with United States Government support under Agreement No. HR0011-07-9-0001 awarded by DARPA. The Government has certain rights in the invention.

BACKGROUND

Early graphic processing units ("GPUs") had dedicated execution units for various 3D graphic functions of a graphics pipeline. These graphics functions include a vertex shader, a geometry shader, and a pixel shader. Over time, the dedicated execution units were replaced with general-purpose execution units that could be programmed to perform each of these graphic functions. To increase performance, the GPUs employed a single-instruction multiple data ("SIMD") or vector model. A SIMD model allows a single issued instruction to operate on multiple elements of a vector. Thus, a GPU that employed a SIMD model could efficiently process large vectors. This efficiency, however, can be adversely affected by "branch divergence." Branch divergence occurs when elements of a vector are processed differently based on a condition being satisfied. When elements are processed differently, a single instruction cannot be issued for the entire vector. Rather, instructions need to be issued to process different portions of the vector and even a separate instruction needs to be issued for each element effectively reducing the processing to scalar processing.

The NVIDIA TESLA GPU architecture employs a single-instruction multiple thread ("SIMT") model to increase parallelism and reduce the adverse affects of branch divergence. One version of the Tesla GPU has 14 streaming multiprocessors ("SMs"). FIG. 1 is a block diagram that illustrates a streaming multiprocessor. Each SM 100 has 8 streaming processors ("SPs") 101. Each SP includes an SP core with scalar integer and floating point arithmetic units. Each SP core is pipelined and multithreaded. An SP core executes an instruction of a thread per thread clock. The SM issues the same instruction to each of the SPs, and each SP executes that instruction as part of four separate threads. Thus, the Tesla GPU effectively has 32 threads that are executed as a parallel unit, referred to as a warp. Each SM supports 24 warps simultaneously. Thus, the Tesla GPU supports over 10,000 threads simultaneously. Each of the 32 threads of a parallel unit has its own instruction pointer and state and operates on its own data. If all 32 threads take the same path of execution, they all continue in lockstep until complete. However, if the paths diverge, then some of the threads will become inactive while the remaining threads continue to execute. At some point, the inactive threads will become active to continue their execution, and the remaining threads will become inactive. As a result, branch divergence can significantly reduce the parallelism with a GPU that employs a SIMT model with parallel units of threads.

To increase performance, many computer architectures employ predicated instructions to help reduce the effects of branches in an instruction pipeline. For example, with an if-then-else statement, the then-instructions (i.e., instruction implementing the then-portion) are to be executed only when the condition is true and the else-instructions are to be executed only when the condition is false. With a conventional architecture, the condition would need to be fully evaluated before the then-instructions or the else-instructions could be issued to the instruction pipeline. In such a case, the instruction pipeline may be completely empty when the condition is finally evaluated. When a program has many branches, the benefits of overlapped execution of the instruction pipeline are greatly reduced because of the need to wait until the condition is evaluated to determine whether the then-instructions or the else-instructions should be issued. Predicated instructions are issued but their results are not committed until and unless their predicate (e.g., condition) is true. With an if-then-else statement, the predicate is the condition. After the instructions to set the predicate are issued, the then-instructions can be immediately issued predicated on the predicate being true, and the else-instruction can also be immediately issued predicated on the predicate being false. Once the predicate is eventually set, then either the then-instructions or the else-instructions whose execution may be mostly complete can be committed depending on whether the predicate was set to true or false. In this way, the instruction pipeline can remain full albeit issuing some instructions that will never be committed. The NVIDIA TESLA GPU architecture supports predicated instructions.

The Tesla GPU architecture is designed to support not only graphics processing but also general purpose computing. Unfortunately, programs written in a high-level language (e.g., C++) may perform poorly on the Tesla GPU. This poor performance may be due to the inability of a compiler to generate code that is fully optimized to the SIMT model. In addition, even if a program is written in a low-level language (e.g., Nvidia's PTX), when branch divergence occurs within the threads of a warp, the program can still perform poorly. It would be desirable to have an automated way to translate a program written in a high-level language to a program in a low-level language that reduces the negative effects of branch divergence within a SIMT model with parallel units of threads.

SUMMARY

A system for controlling a computer to generate code for execution based on a SIMT model with parallel units of threads is provided. The system inputs a SIMD representation of a statement. The system generates instructions for a thread that include an instruction to set a predicate based on whether the thread of a parallel unit corresponds to an element of a vector. The system also generates instructions to perform the vector processing via scalar operations predicated on the predicate. As a result, the system generates instructions to perform the vector processing that avoid branch divergence within the parallel unit of threads that would be needed to check whether a thread corresponds to an element of the vector.

A computer-readable storage medium storing computer-executable instructions for controlling a computer to perform vector processing of elements of a vector as specified within a loop of a program is provided. The computer includes a parallel unit of threads. The instructions include an instruction to set a predicate based on the thread corresponding to an element of the vector and scalar instructions predicated on the predicate to perform the vector processing on the element of the vector represented by the thread so that when a thread of the parallel unit does not correspond to an element of the vector, these predicated instructions are not committed during execution.

DETAILED DESCRIPTION

Figure 1:
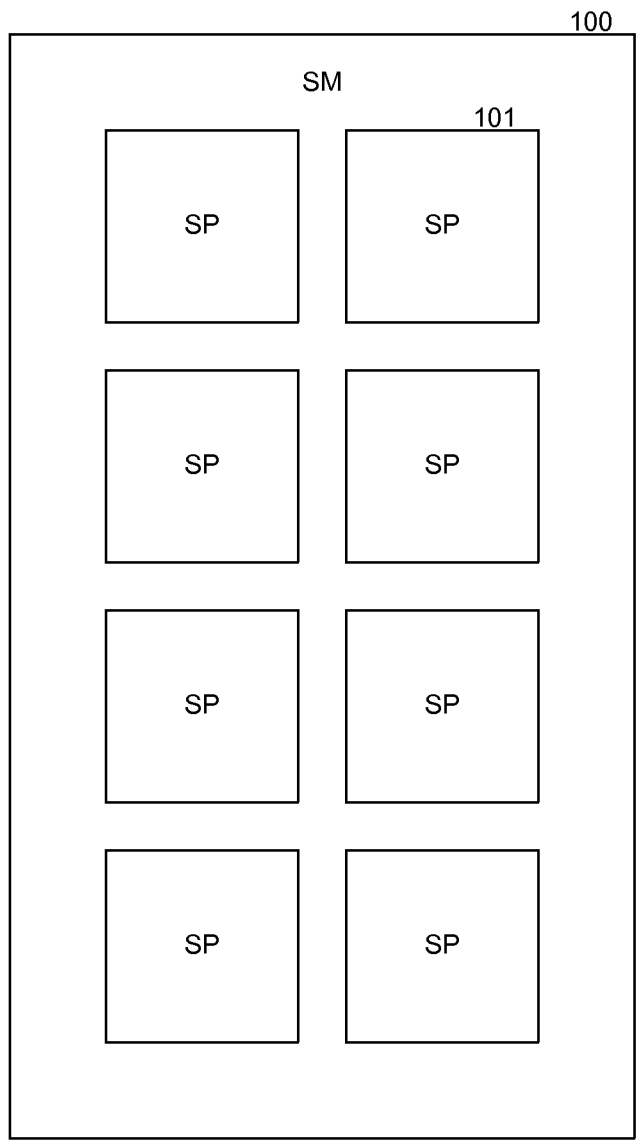
FIG. 1 is a block diagram that illustrates a streaming multiprocessor.

A system for generating code for execution based on a SIMT model with parallel units of threads is provided. In some embodiments, a SIMD-to-SIMT ("SIMD-T") system inputs a SIMD statement. The system translates the statement by generating instructions for a thread that include an instruction to set a predicate based on whether the thread of a parallel unit corresponds to an element of a vector as indicated by the length of the vector and a thread identifier. The system also generates instructions to perform the vector processing via scalar instructions predicated on the predicate. As a result, the system generates instructions to perform the vector processing that avoid branch divergence within the parallel unit of threads that would be needed to check whether a thread corresponds to an element of the vector.

In some embodiments, a SIMD-T system compiles a high-level language ("HLL") program that includes a loop for processing a vector into a SIMT program that includes a thread to process each element of the vector using predicated scalar instructions. The SIMD-T system identifies a loop with the HLL program and determines whether the loop performs vector processing. For example, the following example code is a loop that performs vector processing:

$$\text{for } (i=0; i<n; i++)\{c[i]=a[i]*b[i]\} \quad (1)$$

The for-statement performs vector processing using vectors a, b, and c with a vector length of n. One vector element of each vector is processed during each of the n iterations of the loop. The SIMD-T system may initially convert the identified loop to a SIMD representation using conventional compiler techniques. A SIMD representation represents the loop as a vector instruction. In this example, the following example code is a vector statement for setting each element of vector c to the product of the corresponding elements of vectors a and b:

$$[c+TI:TC]=[a+TI:TC]*[b+TI:TC] \quad (2)$$

This vector statement indicates that the variable TI ("thread identifier") represents the offset for each element of the vectors, the variable TC ("trip count") represents the number of elements in the vectors, and the increment of variable TI is 1 by default. The variables a, b, and c represent the base addresses of the vectors. When this statement is ultimately compiled into machine code, a conventional compiler would generate a corresponding vector instruction that is issued once and executes on each element of the vectors based on a SIMD model. After generating the SIMD representation of the loop, the SIMD-T system translates the SIMD representation of the loop into a SIMT representation using predicated scalar instructions. The scalar instructions are predicated so that when not all the threads of a parallel unit correspond to a vector element, the predicated scalar instructions of those threads are issued but not committed. For example, the following example code is a SIMT representation of the loop:

$$\text{pred}=TI<TC$$

$$[c+TI, 0\#\text{pred}]=[a+TI, 0\#\text{pred}]*[b+TI, 0\#\text{pred}] \quad (3)$$

The first statement sets a predicate to indicate whether the thread corresponds to a vector element. In this example, each thread is provided with a thread identifier (e.g., 0-31) to uniquely identify each thread of the parallel unit. If the thread identifier is less than the trip count, then the thread corresponds to a vector element. Otherwise, it does not. In general, if the vector length is not a multiple of the number of threads in a parallel unit, then some of the threads will not correspond to vector elements. The second statement indicates that the corresponding loading and storing are predicated scalar instructions. That is, the predicated scalar instructions will be committed only when the predicate is not equal ("#") to 0. In addition, the multiplication operator ("*") inherits the predicate of its operands, and thus the multiplication instruction will be committed only when the predicate is not equal to 0. In this way, each of the threads executes the same path of instructions and thus avoids the inefficiencies of divergent paths among the threads of a parallel unit.

In some embodiments, the SIMD-T system may generate predicates for conditional processing of vector elements and aggregate those predicates with the predicate indicating whether a thread corresponds to a vector element. An aggregate predicate indicates an instruction will be committed only when both of those predicates that are aggregated are 1. For example, the following example code illustrates a loop that performs vector processing along with conditional processing:

$$\text{for } (i=0; i<n; i++)\{$$

$$\text{if } a[i]>b[i]\{c[i]=a[i]*b[i]\}\} \quad (4)$$

The loop performs the same processing as the loop of example code 1 except that the multiplication statement is performed only when the corresponding element of vector a is greater than the corresponding element of vector b. The SIMD-T system may initially convert the loop to a SIMD representation using conventional compiler techniques. A SIMD representation represents the loop as a vector instruction that is predicated on the condition of the if-statement. In this example, the following example code illustrates vector statements for setting each element of vector c to the product of the corresponding elements of vectors a and b:

$$\text{pred}=[a+TI:TC]>[b+TI:TC]$$

$$[c+TI:TC:0\#\text{pred}]=[a+TI:TC:0\#\text{pred}]*[b+TI:TC: 0\#\text{pred}] \quad (5)$$

The first statement sets a predicate based on the condition of the if-statement. The second statement is a predicated version of the SIMD representation of example code 2. The instructions for the second statement will not be committed unless the condition of the if-statement is satisfied. The SIMD-T system translates the predicated SIMD representation of the loop into a SIMT representation using predicated scalar instruction. For example, the following example code represents a SIMT representation of the loop with the conditional processing:

$$\text{pred1}=TI<TC$$

$$\text{pred2}=[a+TI, 0\#\text{pred1}]>[b+TI, 0\#\text{pred1}]$$

$$\text{pred3}=\text{pred1}\&\text{pred2}$$

$$[c+TI, 0\#\text{pred3}]=[a+TI, 0\#\text{pred3}]*[b+TI, 0\#\text{pred3}] \quad (6)$$

The first statement sets a first predicate to indicate whether the thread corresponds to a vector element similar to the first statement of example code 3. The second statement sets a second predicate to the condition of the if-statement. The second statement is predicated and thus is committed only when the thread corresponds to a vector element. The third statement generates a third predicate that is an aggregation of the first predicate and the second predicate. The fourth statement corresponds to the second statement of example code 3 but is predicated based on the third predicate. Because the statement is predicated on the third predicate, the statement is not committed unless the thread corresponds to a vector element and the condition of the if-statement is satisfied. In this way, each of the threads executes the same path of instructions, avoiding the inefficiencies of divergent paths among the threads of a parallel unit even when the loop includes conditional processing.

Table 1 illustrates assembly code corresponding to the SIMT code of example code 6. The assembly code is based on the PTX assembler.

TABLE 1

| 1 | cvt.s64.u32 | % sd8, % tid.x; |
|---|---|---|
| 2 | add.s64 | % sd9, % bd2, % sd8; |
| 3 | shl.b64 | % bd3, % sd9, 2; |
| 4 | ld.param.s64 | % sd10, [b]; |
| 5 | add.s64 | % sd11, % bd3, % sd10; |
| 6 | ld.param.s64 | % sd12, [a]; |
| 7 | add.s64 | % sd13, % bd3, % sd12; |
| 8 | setp.lt.s64 | % p2, % sd8, % sd7; |
| 9 | @% p2 ld.global.nc.f32 | % f1, [% sd11]; |
| 10 | @% p2 ld.global.nc.f32 | % f2, [% sd13]; |
| 11 | setp.gt.f32 | % p3, % f2, % f1; |
| 12 | and.pred | % p4, % p3, % p2; |
| 13 | @% p4 ld.global.nc.f32 | % f3, [% sd13]; |
| 14 | @% p4 ld.global.nc.f32 | % f4, [% sd11]; |
| 15 | @% p4 mul.rn.f32 | % f5, % f4, % f3; |
| 16 | @% p4 ld.param.s64 | % sd14, [c]; |
| 17 | @% p4 add.s64 | % sd15, % bd3, % sd14; |
| 18 | @% p4 st.global.f32 | [% sd15], % f5; |

The following is a description of the assembly code of Table 1. Line 1 loads a register with the thread index. Line 2 adds a warp base thread index to the thread index of the thread to give a program thread index. For example, a thread index within a warp ranges from 0 to 31, but when the trip count is greater than 31, then threads will be assigned to multiple warps (or the same warp multiple times). Each warp that starts execution of threads is assigned a warp base thread index of 0, 32, 64, and so on for use in determining the address of the i th element of a vector. Line 3 multiplies the program thread index by four to give the word offset of the i th element of a vector. The architecture is byte addressable, but each element of a vector is a 4-byte word. Line 4 loads the start word address of vector b. Line 5 adds the word offset to the start word address of vector b to give the address of the i th element of vector b. Lines 6 and 7 perform the processing of lines 4 and 5, but for vector c. Line 8 sets the predicate based on the thread index and trip count ("pred1"). The "@" prefix of the instructions indicates those instructions are predicated on the predicate % p2 or % p4. Thus, the instructions of lines 9-10 and 13-18 are all predicated. Lines 9 and 10 load the values of the i th elements of vectors a and b into registers. Line 11 sets a predicate based on the element of vector a being greater than the element of vector b. Line 12 sets the combined predicate. Lines 13 and 14 load the values of the i th elements of vectors a and b into registers. Line 14 multiplies the value of the i th element of vectors a and b. Line 16 loads the start address of vector c. Line 17 adds the offset of the i element to the start address of vector c. Line 18 stores the result of the addition into the i th element of vector c.

Figure 2:
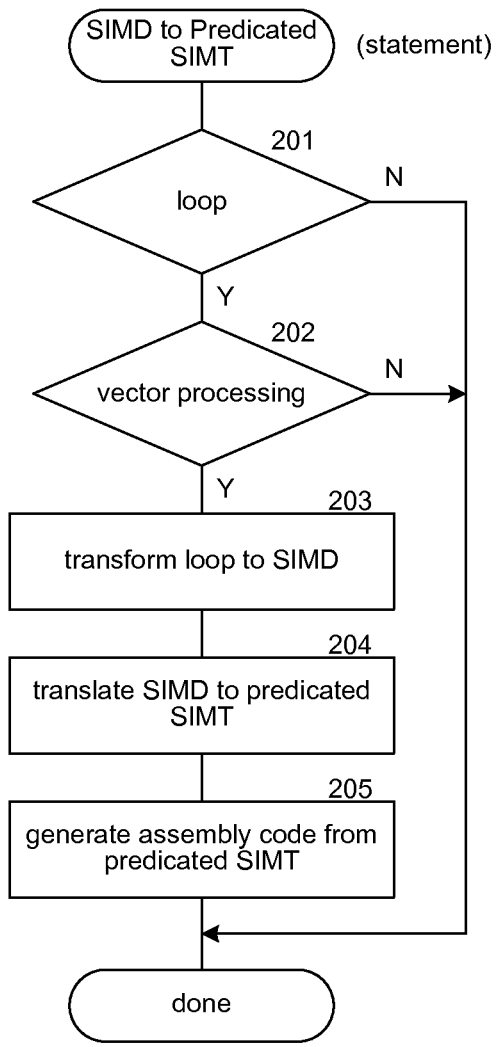
FIG. 2 is a flow diagram illustrating the overall processing of a SIMD-T system to generate a SIMT representation of a loop with vector processing.

FIG. 2 is a flow diagram illustrating the overall processing of a SIMD-T system to generate a SIMT representation of a loop with vector processing. The flow diagram illustrates logical processing of the system. The system is passed a statement during compilation. An actual implementation may process a program in phases. In the first phase, the system translates the entire program generating SIMD representations of loops that perform vector processing. In the second phase, the system translates the entire program generating SIMT representations using predicated scalar operations from the SIMD representation of loops. In the third phase, the system generates assembly code for the SIMT representation. The assembly code can then be compiled into machine code using a conventional assembly program. In decision block 201, if the passed statement is a loop, then the system continues at block 202, else the system returns. In decision bock 202, if the loop includes vector processing, the system continues at block 203, else the system returns. In blocks 203-205, the system performs the first phase, the second phase, and the third phase, respectively. The system then returns.

Figure 3:
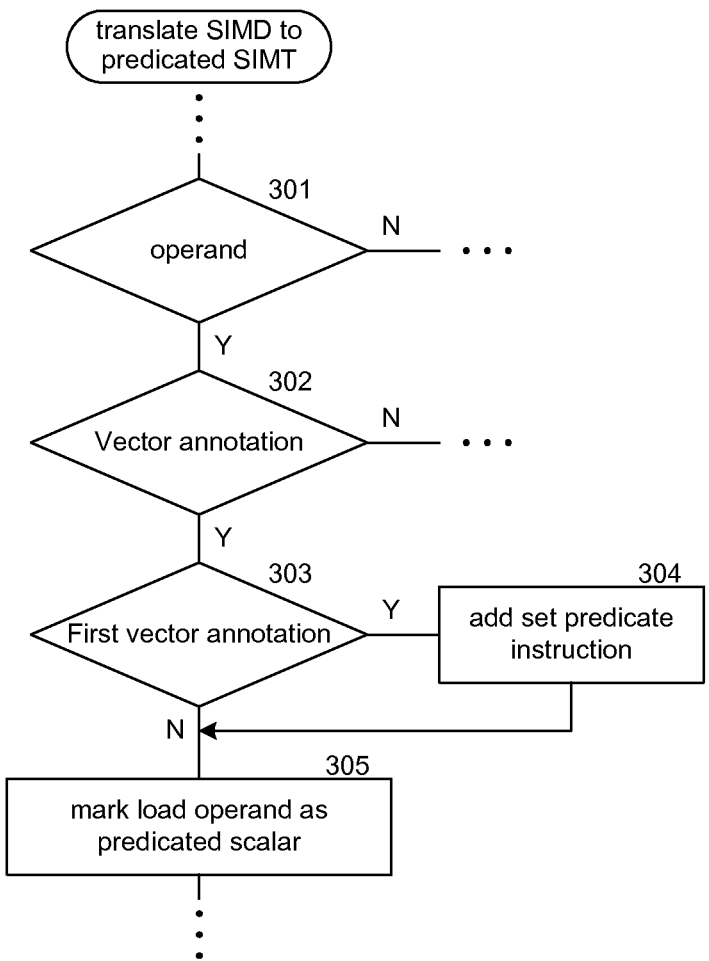
FIG. 3 is a flow diagram that illustrates the processing of the second phase by the SIMD-T system.

FIG. 3 is a flow diagram that illustrates the processing of the second phase performed by the SIMD-T system. The second phase translates a SIMD representation to a predicated SIMT representation. The system may represent the SIMD representation of a program as a syntax tree. The system visits the nodes of the syntax tree generating SIMT representations of vector statements. In decision block 301, if the node represents an operand, then the system continues at block 302, else the system performs other processing appropriate for the node. In decision block 302, if the node represents an operand of a vector statement, then the system continues at block 303, else the system performs other processing appropriate for the node. In decision block 303, if an instruction to set the predicate of the vector statement has not yet been generated, then the system continues at block 304 to generate the instruction to set the predicate and to indicate that the instructions for the vector statement are be SIMT instructions. The system continues at block 305. In block 305, the system marks the load of the operand as a predicated scalar operation within the thread.

The processor on which the SIMD-T system may be implemented may include a central processing unit and local memory and may include input devices (e.g., keyboard and pointing devices), output devices (e.g., display devices), and storage devices (e.g., disk drives). The processor may access computer-readable media that includes computer-readable storage media and data transmission media. The computer-readable storage media includes memory and other storage devices that may have recorded upon or may be encoded with computer-executable instructions or logic that implements the SIMD-T system. The data transmission media is media for transmitting data using signals or carrier waves (e.g., electromagnetism) via a wired or wireless connection. Various functions of the SIMD-T system may also be implemented on devices using discrete logic or logic embedded as an application-specific integrated circuit.

The SIMD-T system may be described in the general context of computer-executable instructions, such as program modules, executed by one or more computers, processors, or other devices. Generally, program modules include routines, programs, objects, components, data structures, and so on that perform particular tasks or implement particular data types. Typically, the functionality of the program modules may be combined or distributed as desired in various embodiments.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-readable storage memory containing computer-executable instructions for controlling a computer to generate code for execution based on a single-instruction multiple thread ("SIMT") model with parallel units of threads, by a method comprising:
   determining whether a program includes vector processing; and
   upon determining that the program includes vector processing, generating instructions for a thread that include an instruction to set a predicate based on whether the thread of a parallel unit corresponds to an element of a vector as indicated by the length of the vector and a thread identifier and instructions to perform the vector processing via scalar operations predicated on the predicate such that
      when a thread corresponds to an element of the vector, the instructions for the thread are committed, and
      when a thread does not correspond to an element of the vector, the instructions for the thread are not committed,
   wherein execution of the generated instructions to perform the vector processing avoids branch divergence within the parallel unit of threads that would result from checking whether a thread corresponds to an element of the vector.

2. The computer-readable storage memory of claim 1 wherein the determining whether a loop within the program includes vector processing.

3. The computer-readable storage memory of claim 2 wherein the generating includes transforming the loop into a single-instruction multiple data ("SIMD") representation using predicated execution to control length of the vector and transforming the loop in the SIMD representation into a SIMT representation with a thread corresponding to each vector element using predicated execution to suppress committing instructions for threads of the parallel unit that do not correspond to an element of the vector.

4. The computer-readable storage memory of claim 3 wherein the generating further includes generating assembly code for a SIMT graphics processing unit ("GPU") from the SIMT representation.

5. The computer-readable storage memory of claim 2 wherein when the vector processing of the loop includes conditional processing for vector elements, the predicate is based on whether the thread corresponds to an element of the vector and of the conditional processing.

6. The computer-readable storage memory of claim 5 wherein the generating further includes generating an instruction to set a predicate based on the conditional processing and an instruction to set an aggregate predicate of the predicate based on the conditional processing and the predicate based on whether the thread corresponds to an element of the vector.

7. The computer-readable storage memory of claim 1 wherein the generating further includes generating an instruction that is not predicated when committing the instruction for a thread that does not correspond to an element of the vector will not change the result of the vector processing.

8. The computer-readable storage memory of claim 7 wherein the non-predicated instruction is scheduled for execution before the instruction to set the predicate.

9. A computer-readable storage medium that is not a transitory, propagating signal storing computer-executable instructions for controlling a computer to perform vector processing of elements of a vector as specified within a loop of a program, the computer including a parallel unit of threads, the instructions of a thread comprising:
   an instruction to set a predicate based on the thread corresponding to an element of the vector; and
   scalar instructions predicated on the predicate to perform the vector processing on the element of the vector represented by the thread so that
      when a thread of the parallel unit does correspond to an element of the vector, these predicated instructions are committed during execution, and
      when a thread of the parallel unit does not correspond to an element of the vector, these predicated instructions are not committed during execution,
   wherein execution of the instructions avoids branch divergence within the parallel unit of threads resulting from the number of elements of the vector not being a multiple of the number of threads of the parallel unit.

10. The computer-readable storage medium of claim 9 wherein the instructions were generated by transforming the loop into a single-instruction multiple data ("SIMD") representation using predicated execution to control length of the vector and transforming the loop in the SIMD representation into a single-instruction multiple thread ("SIMT") representation with a thread for each element of the vector using predicated execution to suppress committing instructions for a thread that does not correspond to an element of the vector.

11. The computer-readable storage medium of claim 10 wherein the instructions are assembly code generated for the computer from the SIMT representation.

12. The computer-readable storage medium of claim 10 wherein the instructions are machine code generated for the computer from the SIMT representation.

13. The computer-readable storage medium of claim 9 wherein when the vector processing within the loop includes conditional processing for vector elements, the predicate is based on an aggregation of whether the thread corresponds to an element of the vector and the conditional processing.

14. The computer-readable storage medium of claim 13 including an instruction to set a predicate based on the conditional processing and an instruction to set an aggregate predicate of the predicate based on the conditional processing and the predicate based on whether the thread corresponds to an element of the vector.

15. The computer-readable storage medium of claim 9 including an instruction that is not predicated when committing the instruction for a thread that does not correspond to an element of the vector will not change the result of the vector processing.

16. The computer-readable storage medium of claim 15 wherein the non-predicated instruction is scheduled for execution before the instruction to set the predicate.

17. A computer for generating code for a program for execution based on a single-instruction multiple thread ("SIMT model") with parallel units of threads, the computer comprising:
   a memory storing computer-executable instructions of:
      a component that identifies a loop within the program; and
      a component that, when the loop is for vector processing, generates instructions of a thread to process an element of a vector, the instructions including an instruction to set a predicate based on whether the thread corresponds to an element of the vector and instructions to perform the vector processing predicated on the predicate so that when a thread corresponds to an element of the vector, the instructions for the thread are committed, and when a thread does not correspond to an element of the vector, the instructions for the thread are not committed wherein execution of the generated instructions avoids branch divergence within the parallel unit resulting from determining whether a thread corresponds to an element of the vector; and a processor that executes the computer-executable instructions stored in the memory.

18. The computer of claim 17 wherein the component that generates transforms the loop into a single-instruction multiple data ("SIMD") representation using predicated execution to control length of the vector and transforms the loop in the SIMD representation into a SIMT representation with a thread for each element of the vector using predicated execution to suppress committing instructions for threads that do not correspond to an element of the vector.

19. The computer of claim 17 wherein when the vector processing of the loop includes conditional processing for vector elements, the predicate is based on an aggregation of whether the thread corresponds to an element of the vector and the conditional processing.

20. The computer of claim 17 wherein the components compose a compiler.

21. The computer of claim 17 wherein the component that generates further generates an instruction that is not predicated, when committing or not committing the instruction for a thread that does not correspond to a vector element will not change the result of the vector processing.

22. The computer of claim 17 wherein the loop includes a loop index and a loop limit, wherein a thread identifier indicates the element of the vector to which a thread corresponds, and wherein a thread does not correspond to an element of the vector based on comparison of the thread identifier to the loop limit.

* * * * *

UNITED STATES PATENT AND TRADEMARK OFFICE
CERTIFICATE OF CORRECTION

Page 1 of 2

PATENT NO. : 9,015,656 B2
APPLICATION NO. : 13/781285
DATED : April 21, 2015
INVENTOR(S) : Terry D. Greyzck It is certified that error appears in the above-identified patent and that said Letters Patent is hereby corrected as shown below:

Specification

In column 3, line 41, delete "a, b, and c" and insert -- $a$, $b$, and $c$ -- therefor.

In column 3, line 41, delete "of n." and insert -- of $n$. -- therefor.

In column 3, line 47, delete "vector c" and insert -- vector $c$ -- therefor.

In column 3, line 48, delete "vectors a" and insert -- vectors $a$ -- therefor.

In column 3, line 49, delete "b" and insert -- $b$ -- therefor.

In column 3, line 52, delete "TI" and insert -- $TI$ -- therefor.

In column 3, line 54, delete "TC" and insert -- $TC$ -- therefor.

In column 3, line 55, delete "TI" and insert -- $TI$ -- therefor.

In column 3, line 56, delete "a, b, and c" and insert -- $a$, $b$, and $c$ -- therefor.

In column 4, line 3, delete "pred=$TI<TC$" and insert -- $pred=TC<TC$ -- therefor.

In column 4, line 5, delete "[c+$TI$, 0#pred]=[a+$TI$, 0#pred]*[b+TI, 0#pred]" and insert -- [c+$TI$, 0#$pred$]=[a+$TI$, 0#$pred$]*[b+$TI$, 0#$pred$] -- therefor.

In column 4, line 39, delete "vector b" and insert -- vector $b$ -- therefor.

In column 4, line 45, delete "vector c" and insert -- vector $c$ -- therefor.

In column 4, line 46, delete "vectors a and b" and insert -- vectors $a$ and $b$ -- therefor.

In column 4, line 47, delete "pred=" and insert -- $pred=$ -- therefor.

In column 4, line 49, delete "[c+$TI:TC$:0#pred]=[a+$TI:TC$:0#pred]*[b+$TI:TC$:" and insert -- [c+$TI:TC$:0#$pred$]=[a+$TI:TC$:0#$pred$]*[b+$TI:TC$: -- therefor.

In column 4, line 50, delete "0#pred]" and insert -- 0#$pred$] -- therefor.

In column 4, line 61, delete "pred1" and insert -- $pred1$ -- therefor.

In column 4, line 63, delete "pred2=$[a+TI$, 0#pred1]>[$b+TI$, 0#pred1]" and insert -- $pred2=[a+TI$, 0#$pred1$]>[$b+TI$, 0#$pred1$] -- therefor.

Signed and Sealed this
Twenty-fourth Day of November, 2015

Michelle K. Lee
*Director of the United States Patent and Trademark Office*

CERTIFICATE OF CORRECTION (continued)

U.S. Pat. No. 9,015,656 B2

Specification

In column 4, line 65, delete "pred3=pred1&pred2" and insert -- $pred3=pred1\&pred2$ -- therefor.

In column 4, line 67, delete "[c+TI, 0#pred3]=[a+TI, 0#pred3]*[b+TI, 0#pred3]" and insert -- $[c+TI, 0\#pred3]=[a+TI, 0\#pred3]*[b+TI, 0\#pred3]$ --

In column 5, line 48, delete "i th" and insert -- $i$ th -- therefor.

In column 5, line 50, delete "i th" and insert -- $i$ th -- therefor.

In column 5, line 53, delete "vector b" and insert -- vector $b$ -- therefor.

In column 5, line 54, delete "vector b" and insert -- vector $b$ -- therefor.

In column 5, line 54, delete "i th" and insert -- $i$ th -- therefor.

In column 5, line 55, delete "vector b" and insert -- vector $b$ -- therefor.

In column 5, line 56, delete "vector c" and insert -- vector $c$ -- therefor.

In column 5, line 57, delete ""pred1")" and insert -- ($"pred1"$) -- therefor.

In column 5, line 61, delete "i th" and insert -- $i$ th -- therefor.

In column 5, line 61, delete "vectors a and b" and insert -- vectors $a$ and $b$ -- therefor.

In column 5, line 62, delete "vector a" and insert -- vector $a$ -- therefor.

In column 5, line 63, delete "vector b" and insert -- vector $b$ -- therefor.

In column 5, line 64, delete "i th" and insert -- $i$ th -- therefor.

In column 5, line 65, delete "a and b" and insert -- $a$ and $b$ -- therefor.

In column 5, line 65, delete "i th" and insert -- $i$ th -- therefor.

In column 5, line 66, delete "vectors a and b" and insert -- vectors $a$ and $b$ -- therefor.

In column 5, line 67, delete "vector c" and insert -- vector $c$ -- therefor.

In column 5, line 67, delete "i th" and insert -- $i$ th -- therefor.

In column 6, line 1, delete "vector c" and insert -- vector $c$ -- therefor.

In column 6, line 2, delete "i th" and insert -- $i$ th -- therefor.

In column 6, line 2, delete "vector c" and insert -- vector $c$ -- therefor.